Patented Apr. 18, 1939

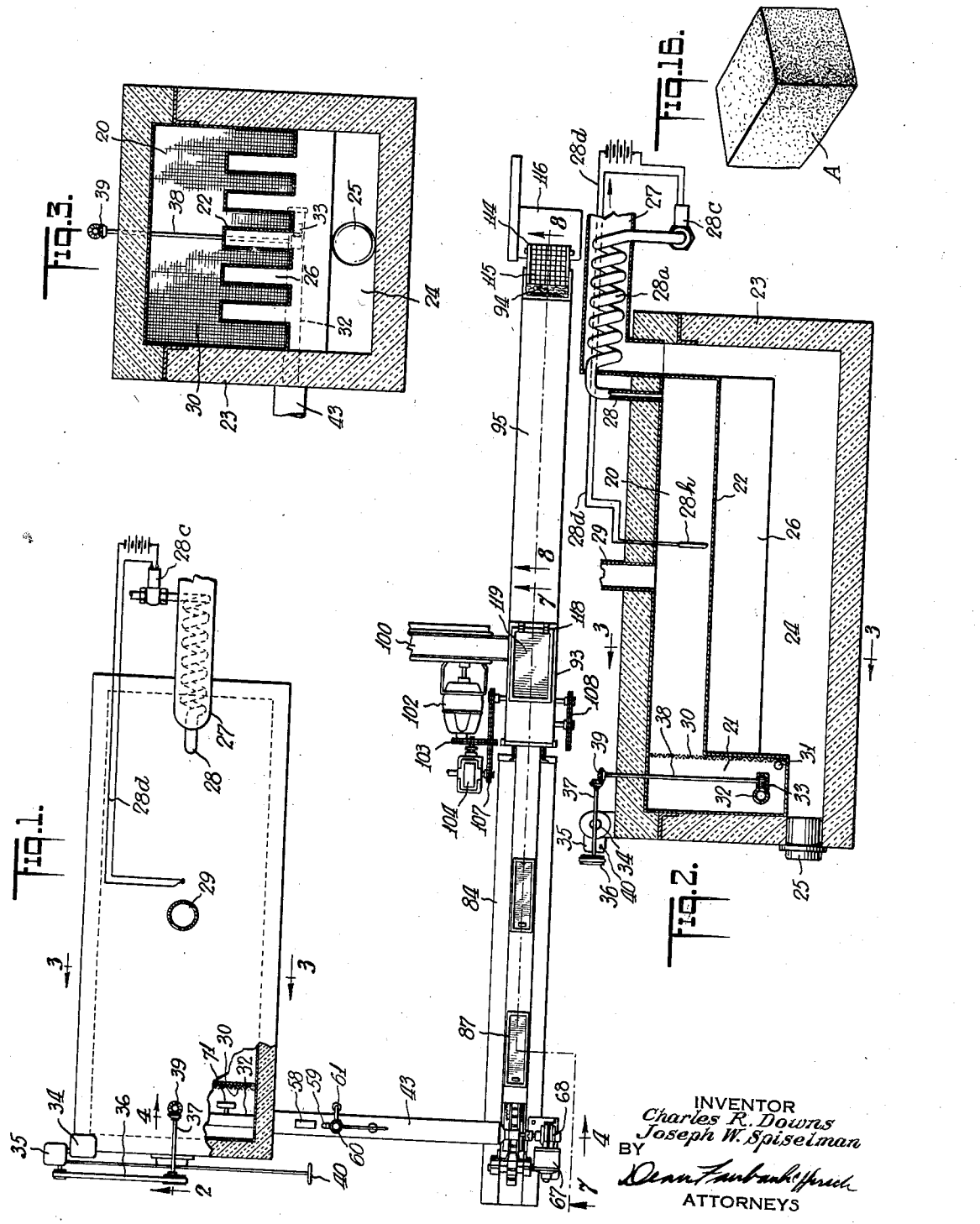

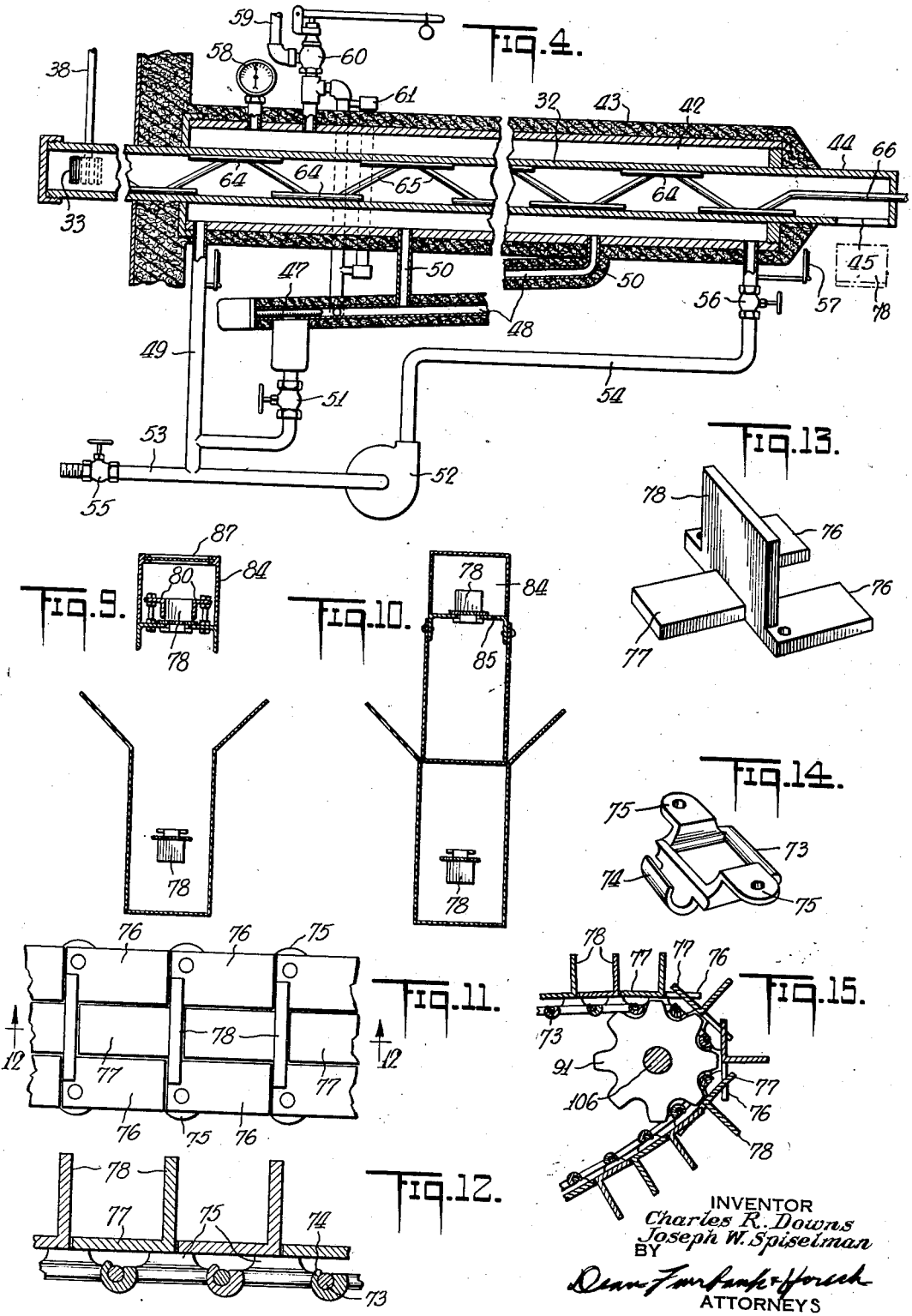

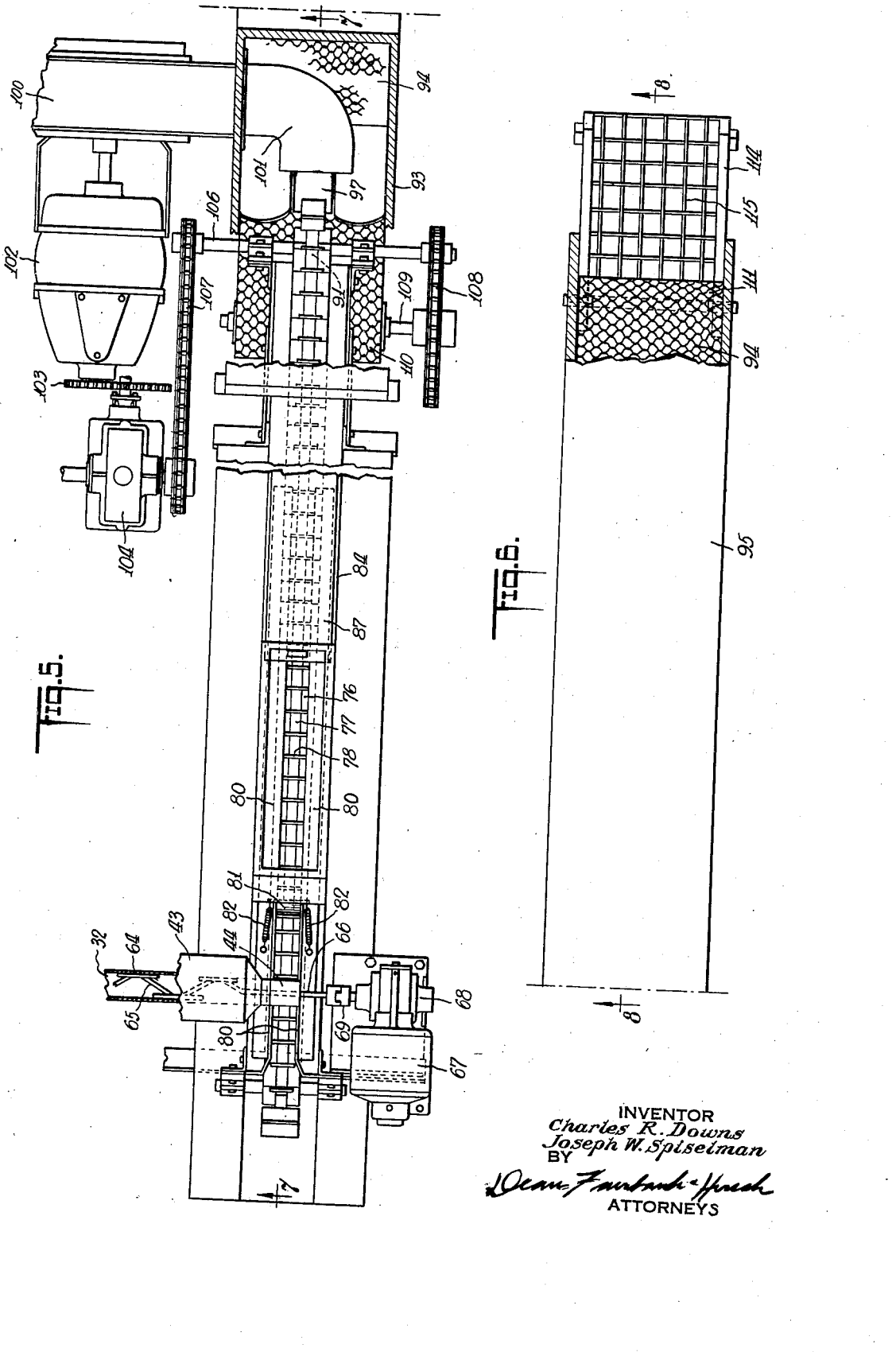

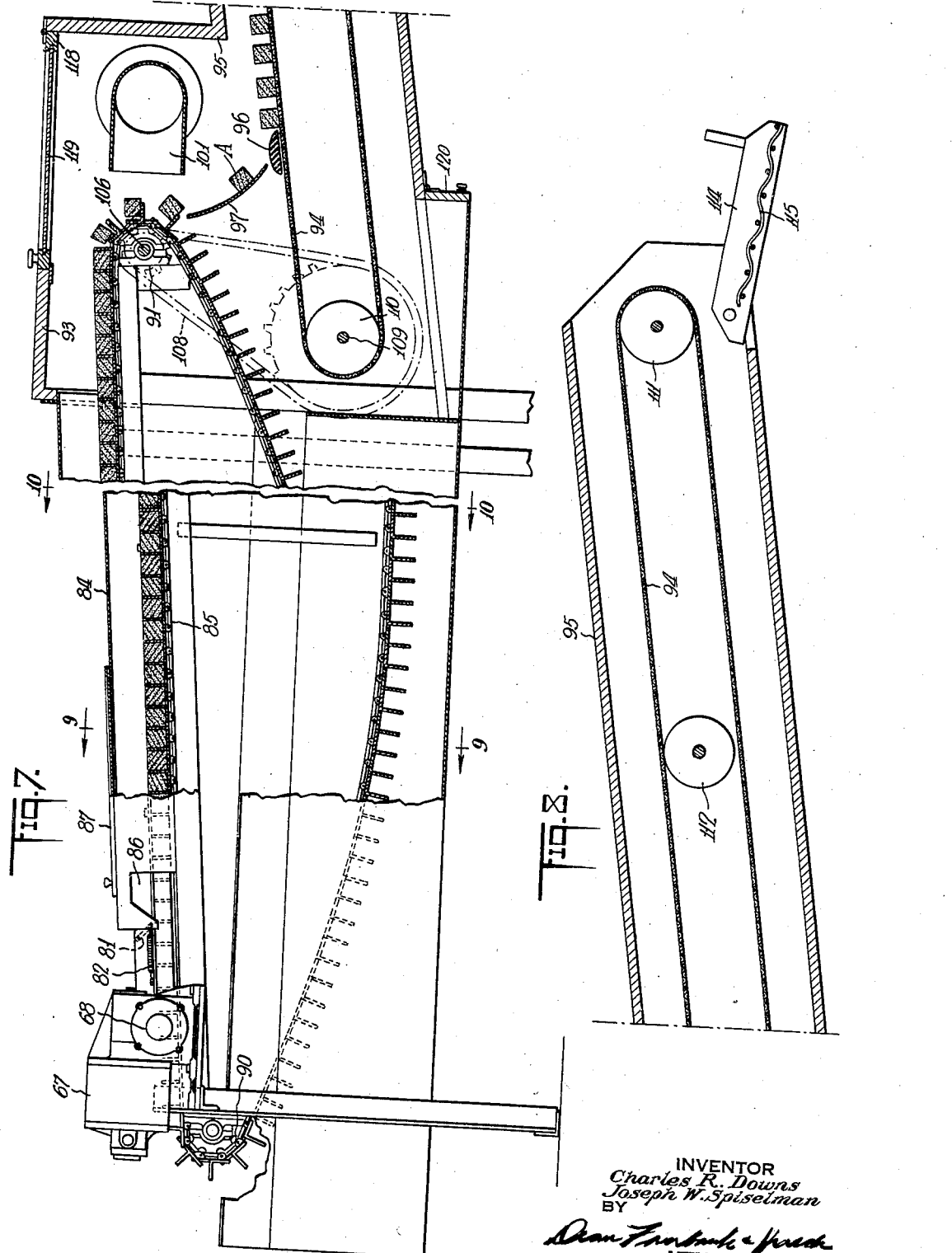

2,154,708

UNITED STATES PATENT OFFICE 2,154,708

APPARATUS FOR MAKING FORMED BODIES OF CALCIUM CHLORIDE HYDRATE OR ANALOGOUS MATERIAL

Joseph W. Spiselman, Mamaroneck, N. Y., and Charles R. Downs, Old Greenwich, Conn., assignors to Calorider Corporation, Greenwich, Conn., a corporation of Connecticut Application August 4, 1938, Serial No. 223,044

15 Claims. (Cl. 18—26)

This application is a continuation in part of our prior copending application, Serial No. 44,700, filed October 12, 1935. The invention embodies certain features and combinations of parts disclosed and originally claimed in said application and also includes certain novel features constituting an improvement on the specific apparatus disclosed in said application.

Although the specific apparatus hereinafter described has been designed primarily for the making of lumps or other shaped masses of solid hydrated calcium chloride primarily useful in the drying of air and other gases, it will be apparent that such apparatus might be employed for making such lumps or shaped bodies of other analogous material, particularly that which may be delivered in a mushy or semi-plastic condition, subdivided into the bodies of the desired shape and size and solidified preferably by heat extraction.

In describing the operation and advantages of our improved apparatus we will refer primarily to the making of shaped masses of solid calcium chloride hydrate of the type disclosed and claimed in our copending application, Serial No. 220,344, filed July 20, 1938, allowed December 12, 1938, and in accordance with the method disclosed and broadly claimed in our copending application, Serial No. 44,700, filed October 12, 1935, and allowed September 19, 1938, but this is merely as an illustration and not as a limitation on the scope of the invention except as incorporated in the claims.

When molten calcium chloride is flowed into pans and cooled to room temperature to solidify, slabs of extreme hardness are formed which, when broken or crushed for the purpose of producing lumps, results in the production of a large amount of fine material which is wasted or has to be reworked. Calcium chloride in humid atmospheres, either in the form of slabs or while crushing them and handling the product, becomes moist, resulting in operating difficulties. When wet lumps of calcium chloride are stored in containers, they will become cemented together at the contact surfaces causing trouble in subsequent handling. The lumps produced not only vary in size which depends upon the screening care employed, but the shapes of lumps of approximately equivalent sizes also vary greatly and present sharp jagged edges and corners. These corners may be broken off in handling and transit producing chips and fines which are objectionable for air conditioning purposes. If shipped in waterproof bags, the bags are often punctured by the sharp protuberances. In order to obviate these difficulties, numerous attempts have been made to perfect the casting of molten calcium chloride in molds. When molten calcium chloride is poured into individual molds of the size and shape of the lumps or forms desired, it is a difficult matter to fill each mold and yet leave no excess that has to be recovered and reworked. Difficulty is also encountered in removing the lumps from the molds and in keeping the walls of the molds free of adhering calcium chloride which interferes with subsequent molding. These various difficulties involve excessive labor costs and prohibitive investment in molds and accessory equipment. The castings produced in this way often contain shrinkage cavities and whether made in individual molds or cast in slabs which are later crushed to form lumps, the crystalline structure, composition and density may vary considerably. These variations may occur not only within a lump but also when comparing one lump with another.

The present invention has for an object the overcoming of these difficulties and the production of dense, non-porous lumps of hydrated calcium chloride of the desired shape and size and of a uniform crystalline structure and composition throughout the individual lumps and also in the different lumps.

Another object of the invention is the provision of an apparatus for producing such lumps in a continuous and substantially automatic manner at low investment and labor costs, which apparatus produces a minimum percentage of fines which are automatically separated from the lumps during the process. The lumps are delivered to receiving or shipping containers in dry form and will not cake together during storage and they exhibit superior resistance to degradation during shipment and handling. The various characteristics cited above make lumps of calcium chloride produced by this apparatus especially suitable for drying air and other suitable gases.

Other objects and advantages of the invention will be apparent as this description proceeds.

In order to describe more fully the apparatus and the influence of the same upon the form and structure of the product, we give below a detailed description of one form of apparatus which has been operated successfully for this purpose, but it is to be understood that having disclosed the principles of the invention, it may be carried out with various changes in the details of the apparatus and we do not intend to be limited by the specific embodiment described.

In the accompanying drawings:

Figure 1 is a top plan view of one form of our improved apparatus;

Figure 2 is a transverse section on the line 2—2 of Figure 1 through the part of the apparatus employed for producing the molten material and on a slightly larger scale;

Figure 3 is a vertical section on the lines 3—3 of Figures 1 and 2;

Figure 4 is a vertical section on the line 4—4 of Figure 1 and through the part of the apparatus for delivering and partially cooling the molten material;

Figure 5 is a top plan view partly in section and corresponding to a part of Figure 1 but on a larger scale;

Figure 6 is a top plan view constituting an extension at the right of Figure 5;

Figure 7 is a vertical section partly in side elevation on the lines 7—7 of Figures 1 and 5;

Figure 8 is a section similar to Figure 7 but showing an extension on the right hand end of the latter on the lines 8—8 of Figures 1 and 6;

Figures 9 and 10 are sections on the lines 9—9 and 10—10 respectively of Figure 7;

Figure 11 is a top plan view of a portion of the conveyor and forming mechanism;

Figure 12 is a section on the line 12—12 of Figure 11;

Figure 13 is a perspective view of element of the conveyor shown in Figures 11 and 12;

Figure 14 is a perspective view of a link of the conveyor carrying the parts shown in Figure 13;

Figure 15 is a section similar to a portion of Figure 7, but on a larger scale; and Figure 16 is a perspective view of the product produced.

In the embodiment of the apparatus shown in the drawings, calcium chloride hydrate is maintained as a concentrated solution or molten mass in the reservoir 20. This is shown as a tank having a sump 21 at one end and having the bottom wall 22 formed of a series of very deep corrugations. The tank is mounted in a heavily insulated jacket 23 and is spaced above the bottom of the latter to form a chamber 24 for the gaseous heating medium. Any suitable arrangement of burners may be provided for forming the heating medium, for instance, there is illustrated a single burner 25 at one end below the sump 21 and from which the heated gases may rise into and flow along the passages 26 formed by the corrugations in the bottom of the tank. The exhaust gas may escape through an outlet 27 at the end opposite to the burner, and the exhaust gases may be employed to preheat the calcium chloride solution used to replenish the charge in the reservoir 20. As shown, a preheated coil 28a is mounted in the exhaust conduit.

The level of the liquid is preferably kept approximately constant by feeding into it continuously or intermittently calcium chloride solution through an inlet 28 at the opposite end from the sump 21. If it is desired to include a deodorizing material, this may be included in the solution, which is sufficiently diluted so that it may be in liquid form at atmospheric temperature, and due to the heating, the excess water content is evaporated off and may escape through the vapor outlet 29. Preferably hot solution is prepared of nearly the desired concentration, in a separate evaporator and delivered at the required rate through the conduit 28. If the hot liquid becomes too concentrated, water instead, or in addition to the diluted solution, may in some cases be delivered to the reservoir. A screen 30 of very fine mesh may be employed in the reservoir between the intake and the sump to remove any solid foreign matter which may be in the raw materials employed or which inadvertently may gain access to the reservoir. The tank may be provided with a drain 31 for emptying.

The molten material is continuously removed from the sump through a conduit 32 extending through the wall of the tank, by means of a gear pump 33 within the sump. The pump may be operated at the desired rate to form the shaped masses and may be driven in any suitable manner but preferably by an electric motor 34 operating through a reduction gearing 35, a belt or chain drive 36, shaft 37, and bevelled gearing 39 disposed outside of the reservoir. From the bevelled gearing a shaft 38 extends through the top of the reservoir to the pump 33. In order that the speed of the pump may be readily controlled to deliver the material at the proper rate in respect to the rate of travel of the conveyor hereinafter referred to, the driving ratio of the reduction gearing 35 may be adjusted through a handle 40 disposed in convenient reach of the operator observing the delivery of the material from the conduit 32 to the forming conveyor.

The conduit 32 which receives the molten material from the reservoir serves several functions. In it the molten material is cooled to a lower temperature to effect partial crystallization or solidification of the molten material to a mushy condition; the heat of crystallization is removed; the material is agitated and kept in turbulent motion to insure the formation of fine crystals and prevent crystals from cementing together; the walls of the conduit are scraped to prevent accumulation of crystals or solid material on said walls; and the evaporation of water is prevented even to a small percentage. The cooling is so controlled to give the lowering of temperature which will effect such crystallization or solidification as is necessary to give the discharged product a mushy consistency. That is, such a portion (preferably over one-half) of the material is solidified or crystallized as will leave sufficient liquid to permit the material to be discharged and be subdivided into sections to form the shaped bodies.

As illustrated the conduit 32 has a jacket 42 on the portion outside of the reservoir and this is provided with a suitable insulating layer or coating 43. The cooling jacket 42 and the insulation terminates a short distance from the end portion or nozzle 44 of the conduit and such nozzle has an outlet 45 which is preferably on the under side as shown in Figure 4. Any suitable fluid such as oil, steam, water, or the like, may be circulated in the jacket and at the desired temperature and rate of flow to bring about the desired lowering of the temperature and the removal of heat of crystallization, but at the same time maintain a sufficiently high temperature to prevent complete solidifying or plugging of the conduit.

In forming shaped bodies of calcium chloride hydrate the material in liquid form may be maintained in the reservoir at a temperature of about 172° C. at atmospheric pressure and if the lumps are to be primarily of the calcium chloride dihydrate in a matrix of the tetrahydrate, the temperature in the reservoir should be between 158° C. and 175° C. which corresponds to a total water content of between 32% and 25% and a percentage of dihydrate of between about 49.4% and 96.6%.

Control of temperature and the concentration consists of maintaining contents of the reservoir 20 boiling or simmering at a predetermined temperature in the above noted range. Since such concentrated solutions can be superheated, such boiling control can be practiced even in the particular range of concentrations which are theoretically impossible to obtain under atmospheric pressure; and such superheating for a given concentration is the function of the heating rate for a particular apparatus.

This boiling temperature can be maintained by feeding into the tank under thermostatic control continuously or intermittently dilute calcium chloride solution through an inlet 28. A temperature control means such as a bulb 28b is immersed in the contents of the tank and actuates through proper connections 28d a control valve shown as a solenoid valve 28c on feed line 28. As the temperature rises above the predetermined setting, solution enters through 28 and its flow is shut off or modulated as the proper temperature is reestablished.

Hot water and/or steam under suitable pressure is preferable as the cooling and temperature controlling means for the material passing through the conduit 32. The circulation may be thermocyclic or positive or a combination of both. As shown, there is provided an electric or other suitable heater 47 in an insulated pipe 48 provided with an inlet connection 49 leading from the jacket 42 adjacent to one end, and one or more outlet connections 50 leading to the jacket 42 intermediate of its ends or adjacent to the delivery end. The inlet connection 49 may be provided with a valve 51 whereby the rate of thermocyclic flow may be controlled.

In addition thereto, there is preferably provided a pump 52 leading from the inlet connection 49 as well as from a source of outside water supply 53, and having an outlet pipe 54 delivering to the jacket 42 adjacent to the delivery end. Pipe 54 may be left uninsulated, or if necessary, may be provided with a heat-radiation or dissipating section. Suitable valves 55 and 56 are provided for controlling the amount of water which may be taken in from the outside and regulating the flow into the jacket. A thermometer 57 is provided whereby the temperature of the water delivered by the pump to the jacket may be readily observed.

The steam pressure in the jacket and therefore, the temperature in the jacket may be observed by a pressure gauge 58 and a steam or water outlet 59 is provided with a safety valve 60. The outlet pipe 59 may have a branch leading from the pipe 48. This branch or any other suitable part may be provided with a water glass 61 whereby the level of the liquid in the jacket may be observed and the desired level may be maintained. The heater is employed upon starting to make sure that there is not too great a cooling before the cooling fluid has been heated up by the material in the conduit. This heater is also used in starting operations from a previous shutdown to generate necessary steam temperatures to soften the solidified plug of calcium chloride hydrate remaining from the previous operation. This plug is softened sufficiently to allow extrusion thereof and resumption of normal operation. This plug is allowed to form on shut-downs to take the place of a valve and prevent liquid from leaving the tank through the conduit. The heater may be shut off after starting and the temperature kept at the desired point by the control on the pressure on the steam generated, if water be the medium employed. If oil or the like be used as the cooling fluid there is preferably provided a separate cooler through which the oil is circulated in series with the jacket.

In the conduit 32 there is provided an agitating and scraping mechanism. This may be of any suitable type but is illustrated as a series of alternately disposed scrapers 64 in overlapping relationship and connected by a zig-zag bar 65 rotated by a shaft 66 extending through one end of the conduit. The shaft may be driven in any suitable manner, for instance, by an electric motor 67 and a reduction gearing 68. The connection between the gearing and the shaft preferably includes a clutch 69 whereby the parts may be readily disconnected. The conduit 32 is preferably provided with a safety valve 71 in the reservoir and on the delivery side of the gear pump so that in case the material should solidify in the conduit 32 or the nozzle to such extent as to plug it or offer too high resistance to flow due to too great cooling, the liquid delivered to the conduit by the pump may escape back into the reservoir. In practice it has been found that a conduit 32 having the portion outside of the tank about 8 feet long and 1½ inches inside diameter, is satisfactory.

The mushy crystalline material delivered through the outlet 45 of the nozzle is received by a conveyor and is subdivided into the desired shaped bodies while the material is sufficiently hot and therefore, sufficiently soft or mushy to permit of such separation. It should be as stiff as possible but allowing a safe margin so that the tube will not plug and the chambers on the conveyor may be completely filled. This conveyor and subdividing means may be a belt having an approximately horizontal run with the belt bent to forming a U-shaped channel, and with a separate subdividing means as shown in our application 44,700 above referred to, although preferably the conveyor itself carries the subdividing means. As illustrated, the conveyor includes a chain having a series of links 73, each with a pintled sleeve or hook-shaped portion 74 to connect it to the next link, and with laterally extending lugs 75 as shown particularly in Figure 14. Secured to each link is a conveyor section preferably of the type shown in Figure 13. This section includes a pair of base plates 76 extending lengthwise of the chain in one direction and a single base plate 77 extending lengthwise of the chain in the opposite direction. The three base plates are normally in the same plane and are of the same length, and the space between the two plates 76 is equal to the width of the plate 77. In addition to the base plates 76 and 77 there is a partition or subdividing plate 78 extending at right angles to the plane of the base plates and its lower edge is secured to or integral with the base plates. Preferably, the structure as shown in Figure 13 is formed from a single casting. The plate 78 is of a height and width substantially equal to the height and width of the desired lump or block and the base plates 76 and 77 are of a length equal to the desired length of the lump or block as shown in Figure 16.

Other dimensions and proportions would be used for other sizes and shapes of the formed bodies.

If the blocks or lumps are to be used for dehydrating air or other gases, they preferably have their various dimensions in excess of one inch and ordinarily not much greater than two inches. The commercial apparatus embodying the present invention makes a block such as shown in Figure 16 having dimensions of 2"x1⅜"x1½".

Each of the conveyor sections as shown in Figure 13, is secured to a corresponding link of the chain. This may be by spot welding the lugs 75 to the under side of the base plate 76 substantially beneath the plate 78, or they may be secured by screws, bolts, or other suitable fastening means. In a horizontal run of the conveyor the base plate 77 of each conveyor element will fill the space between the base plates 76 of the adjacent element and the plates 78 of successive elements will be in parallelism. As the conveyor chain passes around a sprocket wheel the conveyor elements will be moved relatively to each other and the free ends of the base plates 76 and 77 nearest to the plate 78 of adjacent elements will swing upwardly as shown in Figure 15. Thus, there will be effected a complete freeing or dislodging of the block formed on the base plates and between the adjacent partition plates.

The conveyor is mounted so that it has an approximately horizontal run directly beneath the outlet 45 in the nozzle 44 and in a direction at right angles to the delivery conduit 32. Along a portion of the path of the conveyor beneath the outlet 45 of the conduit 32 there are provided a pair of side walls 80 spaced apart to a distance substantially equal to the width of the partition plates 78 and with their lower edges closely adjacent to the upper surface of the outer edge portions of the base plates 76 of the conveyor sections. (See Fig. 9.) Thus, as the conveyor moves along between these side walls 80 the mushy material discharged from the outlet 45 may completely fill the pockets or chambers defined by the side walls 80, the base plates 76, 77, and the partition plates 78. The side walls 80 in advance of the trowel member 81 are preferably somewhat higher than the conveyor sections so that the mushy material may pile up on the conveyor to a depth considerably greater than the height of the partition plates 78. In order to hold back the excess material to insure the complete filling of said chambers, and to smooth off the top of the material filling the chambers of the conveyor, there is provided a dam or trowel member 81 at a short distance from the conveyor outlet and preferably pivoted at one end and pulled down to the desired limiting position by coil springs 82.

It is not necessary for the side walls 80 to extend along the full length of the horizontal run of the conveyor and in fact, it is preferable that these side walls terminate at a point determined by the speed of travel of the conveyor and the rate of solidification of the mushy material so that as soon as the material has solidified to form-retaining hardness, the formed sections pass beyond the end of the plates 80 and have their lateral sides exposed. If the molten material be boiling at a temperature of 172° C. in the reservoir and is cooled to approximately 160° C. in the conduit 32 to give the desired partial solidification and mushy consistency, a further cooling of only a very few degrees is required for the lumps or blocks to acquire form-retaining hardness.

To cool the blocks or lumps as rapidly as possible, the upper approximately horizontal run of the conveyor is in an air tunnel 84 extending approximately the full length of the upper run of the conveyor and terminating at the dam or troweling member 81 which, as previously noted, is spaced only a short distance from the discharge nozzle. The lower side of the air tunnel 84 may be formed of spaced angle irons 85 which serves as supports for the conveyor chain so as to maintain the upper run of the conveyor substantially straight. Air is delivered to the tunnel from the delivery end of the conveyor so as to flow countercurrent to the direction of movement of the conveyor, and the air blast may escape from the tunnel through lateral outlets 86 closely adjacent to the troweling member. The top wall of the tunnel may be provided with a removable cover 87 which may be, in part, of glass to permit inspection of the blocks just before and just after they leave the ends of the side walls 80. Thus, the operator may readily observe whether the cooling in the conduit 32 has been to the proper extent, or if the cooling from the air blast is such that the blocks have form-retaining hardness when they leave the end of the side walls 80, and to also observe whether the mushy material was sufficiently free flowing when it reached the troweling member 81 to insure complete filling of the chambers on the conveyor.

The cooling which is effected while the blocks are on the conveyor serves to remove not only a portion of the sensible heat but also the latent heat developed by the further crystallization of the remaining liquid which forms the matrix for the previously formed crystals. The cooling is effected in part by the blast of air in the air tunnel, and in part by the conduction of heat through the walls of the conveyor sections.

The conveyor passes over a pair of sprockets 90 and 91 at opposite ends of the tunnel. Only one of these sprockets need to be driven, and this is preferably the sprocket 91 at the delivery end of the tunnel, the other sprocket being a mere idler. In order to insure further cooling and solidification to the desired degree of hardness to permit rough handling, it is desirable to remove the blocks from the conveyor above referred to as promptly as reasonably possible in order that heat removal may more effectively take place from all sides of the blocks or lumps.

The delivery end of the conveyor is mounted in a casing 93 where the blocks or lumps are dislodged from the conveyor by the relative movement of the base plates and partition plates, and are delivered to a second conveyor 94 which is in a second air tunnel 95 and has its receiving end in the casing 93 below the sprocket 91. The conveyor 94 is preferably of coarse wire mesh or otherwise reticulated, so that cooling air may get at the blocks or lumps from all sides. To avoid danger of breaking the lumps as they fall from the first conveyor to the conveyor 94, in case they are not sufficiently hard to stand any rough handling, there is provided a pad 96 held above the conveyor 94 and onto which the blocks may fall. Associated with the pad there is preferably provided a guide wall 97 to partially break the force of the fall and to prevent blocks from so falling that they may tumble off the receiving end of the conveyor 94.

As previously noted, the delivery end of the first conveyor, the receiving end of the second conveyor and the ends of the two air tunnels 84 and 95 are in a casing 93. Separate blowers might be used for the two tunnels but preferably we employ only one. As shown, there is provided a fan 100 adjacent to the casing 93 and having an air delivery conduit 101 in the casing 93, preferably directed toward the air tunnel 84. A portion of the air delivered will flow through the tunnel 84 above the upper run of the first conveyor, a portion will travel along with the conveyor 94 in the tunnel 95 and a portion will pass along the lower run of the first conveyor so as to cool the latter and remove the heat which it absorbed from the blocks or lumps carried thereby.

The fan is shown as driven by an electric motor 102 which also serves to provide the power for driving both of the conveyors. The motor may be connected by reduction gearing 103 to a speed reducer 104 and the latter may drive the shaft 106 of the sprocket 91 through a chain 107. The shaft 106 may be connected by a chain 108 to a sprocket on the shaft 109 of the drum 110 which carries the conveyor 94. The relative sizes of the drum 110 and the sprockets of the shaft 106 are such that the conveyor 94 travels at a lineal velocity considerably less than that of the first conveyor. Thus, the lumps or blocks may pile up to a limited extent on the conveyor 94 and may be advanced at a comparatively slow rate through the tunnel 95 so that when they are delivered they will be sufficiently cool and sufficiently hard to permit reasonably rough handling and direct packaging, but they are preferably not cooled to the point at which they will absorb moisture from the air and deliquesce. Thus, they may be packaged in a dry state and the final cooling and final hardening may take place in the container where they are protected from moist air.

At the delivery end of the tunnel 95 the conveyor extends around a drum 111 and additional drums or idlers 112 may be mounted along the tunnel 95 to support the upper run of the conveyor. At the delivery end of the tunnel and beneath the drum 111 is provided suitable means for directing the lumps or blocks into a container. As shown, this includes a frame 114 pivoted to the lower portion of the tunnel and provided with a very coarse screen bottom 115. The apertures of this screen are such that the lumps or blocks cannot fall through, but any small fragments, chips, or fines which may have broken from the lumps in falling onto or from the conveyor 94, or otherwise formed, may fall through. The frame 114 may be tilted downwardly to permit the lumps or blocks to rattle along the upper surface and fall into a shipping and storage container, and it may be swung to approximately horizontal position as shown in Figure 8 so as to permit the accumulation of the lumps thereon while changing containers. The delivery end of the conveyor 94 may be at such an elevation that containers may be placed on a platform scale 116 therebeneath and each container filled to a predetermined weight.

In practice the belt conveyor 94 may be slack so that the lower run will act to sweep the fines down the lower inclined wall of the tunnel 95, but the air traveling along the lower run may cool the fines to the point where they absorb moisture from the air, liquefy and run down said inclined wall.

For lumps or blocks of calcium chloride hydrate it is satisfactory to employ a burlap bag with a moisture-proof paper liner as the container. Such bags may be filled with 100 lbs. or any other desired weight for shipment and storage. Any fines that fall through the mesh conveyor 94 and the screen 115 may be returned to the reservoir for remelting.

In order that the character of the lumps delivered from the first conveyor to the second in the chamber 93 may be readily observed and the operations conducted at such a rate as to insure the desired hardness, the casing 93 may be provided with a cover 118 preferably including a transparent section 119. Both air tunnels and the conveyor runs therein are preferably inclined upwardly from the receiving toward the delivery end and any fines falling through the conveyor 94 and collecting in the bottom of the chamber 93 may slide down into the chamber 93 and be removed by opening a door or closure 120.

Having thus described our invention, what we claim as new and desire to secure by Letters Patent is:

1. In an apparatus for forming solid hydrated calcium chloride, a reservoir for liquid hydrated calcium chloride, means to heat the reservoir, a pump for pumping the heated calcium chloride from said reservoir, a cooling conduit through which the heated calcium chloride is pumped and a nozzle through which it is extruded in a mushy state, means to maintain the material under constant agitation in said conduit, means to remove heat from the material in said conduit, means to shape the material on discharge from said nozzle and means to cool it to a solid state in its shaped condition.

2. In an apparatus for producing hydrated calcium chloride of a mushy consistency, a tank for containing molten hydrated calcium chloride, a closed tube leading from said tank, a heated variable speed pump for maintaining a predetermined rate of flow of molten hydrated calcium chloride through said tube, an agitator to scrape crystallizing material from the internal wall of said tube, and for maintaining a constant agitation of the material in said tube, a jacket enclosing said tube through which a cooling liquid is circulated, and means for further cooling to solidify the material after discharge from said tube.

3. In an apparatus for producing solid hydrated calcium chloride, in combination, a tank for containing molten hydrated calcium chloride, a closed conduit, means for controlling the rate of flow through said conduit, cooling and agitating means associated with said conduit for cooling and converting the material passing therethrough into a crystalline suspension and means for further cooling to solidify the material.

4. In an apparatus for use in forming hydrated calcium chloride or the like into solid lumps, in combination, a tank, means for maintaining liquid hydrated calcium chloride at a predetermined temperature therein, a conduit having a discharge nozzle, means for forcing hydrated calcium chloride from said tank through said conduit and nozzle, means to scrape crystallized material from the walls of the conduit and for maintaining a constant agitation of the material in said conduit, cooling means for cooling the material passing through said conduit to cause the material to be discharged therefrom in a partially crystallized state, a moving conveyor positioned to receive the material from said nozzle, means to subdivide the material into lengths on said conveyor, and means to further cool the material after subdividing and while it is supported on said conveyor.

5. An apparatus for forming solid bodies of a material solid at room temperature but liquid at high temperature, including in combination, a tank, means for heating the material in said tank and maintaining it in a liquid condition at a predetermined temperature, a conduit leading from said tank and having a discharge nozzle, a pump for controlling the flow of said liquid from said tank through said conduit and nozzle, means for mechanically agitating the material in said conduit, means for cooling the material passing through said conduit to cause the material to be discharged from the nozzle in a partially solidified state, a conveyor positioned to receive the material from the nozzle, means for subdividing the material on said conveyor into lengths, and means for facilitating the cooling of the severed material supported on said conveyor.

6. An apparatus for forming solid bodies of predetermined shape from crystallizable material, including a tank, means for delivering solution of said material in heated condition to said tank, means for heating the material in said tank, means for controlling the delivery of solution to the tank in accordance with the boiling temperature in the tank, a closed conduit, and means to cool and agitate the material in said conduit to cause the material to be discharged therefrom in a mushy state into a suitable shape-forming means.

7. An apparatus for forming solid bodies of predetermined shape from liquefied crystallizable material, including a tank, means for heating the liquid in said tank to the boiling point, means for delivering heated liquid to said tank at a rate controlled by the boiling temperature of the liquid in the tank, a closed conduit, and means to cool and agitate the material in said conduit to cause the material to be discharged therefrom as a crystalline suspension into a suitable shape-forming means.

8. In an apparatus for producing hydrated salts, in combination, a tank for containing said salts, means for heating said tank to maintain said salts in a molten condition, a closed conduit leading from said tank, heated means for controlling the rate of withdrawal of said salts through said conduit, cooling and agitating means associated with said conduit for cooling and converting said salts passing therethrough into a crystalline suspension, and means for further cooling to further crystallize said salts and to solidify the material after discharge from said conduit.

9. In an apparatus for producing a finely crystalline magma of hydrated salts, in combination, a heated tank for containing said salts in a molten condition, a closed conduit leading from said tank, heated means for controlling the rate of withdrawal of said salts through said conduit, means to scrape the crystallized salts from the wall of the conduit and to agitate the material in the conduit, cooling means for removing the heat from the material passing through said conduit to cause the material withdrawn therefrom to be discharged in a partially crystallized state, and means for further cooling to solidify the material after discharge from said conduit.

10. In apparatus for use in forming solid lumps from a liquid capable of crystallizing, such as hydrated calcium chloride, the combination of a conduit, means for forcing hydrated calcium chloride through said conduit, a cooling jacket surrounding said conduit, means to keep the conduit wall free from adhering solidified calcium chloride, a conveyor having compartments into which said conduit discharges, a second conveyor onto which said first conveyor discharges the shape-retaining lumps formed in said compartments, said conveyor being reticulated to permit small fragments to fall therethrough, means for driving said second conveyor at a lower lineal velocity than said first conveyor whereby the lumps are in piled condition on said second conveyor, and means for cooling the material on each of said conveyors.

11. In apparatus for use in forming hydrated calcium chloride or the like into solid lumps, in combination, a tank, means for maintaining liquid hydrated calcium chloride at a predetermined temperature therein, a conduit leading from said tank, a pump for forcing hydrated calcium chloride from said tank through said conduit, means for cooling and agitating the material passing through said conduit to cause it to be discharged from the conduit in a partially crystallized state, a synchronous moving conveyor positioned to receive the material from the conduit, means to subdivide the material into lengths, a second conveyor for receiving the solid lumps from the first conveyor, and means to further cool the material by contact with air to a temperature not less than its deliquescence point, on one of said conveyors.

12. An apparatus for forming shaped bodies of solid material, including a tank for molten material, a conduit for delivering the molten material therefrom, a conveyor for receiving the molten material, and having means for subdividing it into separate sections on the conveyor, a second conveyor for receiving the material from the first conveyor, and in the form of a reticulated belt permitting exposure of the shaped bodies on all sides, a pair of tunnels within which said conveyors are mounted, means for delivering cooling air through said tunnels, a casing connecting said tunnels, and means for delivering a blast of cooling air to said casing, whereby it travels countercurrent to one conveyor and concurrent with the other conveyor.

13. An apparatus for forming shaped bodies from crystallizable material, including a tank for molten material, a conduit for delivering said material from the tank, means for cooling said conduit to partially crystallize the material therein, an agitator within said conduit, and a conveyor having a substantially horizontal run disposed beneath the end of said conduit, and including a plurality of pivotally connected sections having partition plates and base plates forming chambers to receive the partially crystallized material, and means for cooling the material in said chambers on said conveyor to further the crystallization to give the product form-retaining hardness.

14. An apparatus for forming shaped bodies from flowable material, including a tank, means for heating said tank to maintain the material in liquid condition in said tank, a discharge conduit from said tank, means for controlling the delivery of the material through said conduit, means to cool the material in said conduit, means to agitate the material in said conduit to cause the material to be discharged therefrom in a mushy state, and a series of articulated molds for receiving said material and in which it is formed into the shaped bodies, and including a series of relatively movable sections each having a partition plate and narrower base plates extending lengthwise of the conveyor upon opposite sides of the partition plate, said base plates of each two adjacent sections being disposed side by side laterally of the conveyor and cooperating to form a substantially complete material supporting wall between adjacent partition plates, each of said base plates extending more than half way to the partition plate of the adjacent section, whereby upon relative tilting of said sections each solid body is positively freed from both of the partition plates and all of the base sections contacting therewith.

15. An apparatus for forming shaped bodies, including a tank, means for heating said tank to maintain the material in liquid condition in said tank, a discharge conduit from said tank, means for controlling the delivery of the material through said conduit, means to cool the material in said conduit, means to agitate the material in said conduit to cause the material to be discharged therefrom in a mushy state, and a conveyor made up of a series of sections each having a partition plate and at least two base plates, one extending substantially the full distance from the partition plate to the partition plate of the next adjacent section on one side, and the other base plate extending substantially the entire distance to the partition plate of the adjacent section on the other side, the base plates between adjacent partition plates being disposed side by side transversely of the conveyor and jointly forming a material supporting wall, said conduit delivering the material to the spaces between the partition plates to form the shaped bodies, said sections being pivotally connected whereby upon tilting one section in respect to the adjacent one the intervening solid body is freed from each section by the end portion of the base plate of the other section.

JOSEPH W. SPISELMAN.
CHARLES R. DOWNS.